(12) United States Patent
Shen et al.

(10) Patent No.: US 11,914,179 B2
(45) Date of Patent: Feb. 27, 2024

(54) RADIATIVE COOLING OPTICAL FILTER, ITS PREPARING METHOD AND APPLICATION

(71) Applicant: ZHEJIANG UNIVERSITY, Zhejiang (CN)

(72) Inventors: Weidong Shen, Zhejiang (CN); Huaxin Yuan, Zhejiang (CN); Chenying Yang, Zhejiang (CN); Xiaowen Zheng, Zhejiang (CN); Wen Mu, Zhejiang (CN); Zhen Wang, Zhejiang (CN); Wenjia Yuan, Zhejiang (CN); Yueguang Zhang, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 681 days.

(21) Appl. No.: 17/263,161

(22) PCT Filed: Jan. 18, 2019

(86) PCT No.: PCT/CN2019/072320
§ 371 (c)(1),
(2) Date: Jan. 26, 2021

(87) PCT Pub. No.: WO2020/024566
PCT Pub. Date: Feb. 6, 2020

(65) Prior Publication Data
US 2021/0191017 A1    Jun. 24, 2021

(30) Foreign Application Priority Data
Aug. 3, 2018 (CN) .......................... 201810882085.9

(51) Int. Cl.
G02B 5/26 (2006.01)
G02B 7/00 (2021.01)

(52) U.S. Cl.
CPC .............. *G02B 5/26* (2013.01); *G02B 7/008* (2013.01)

(58) Field of Classification Search
CPC . G02B 5/26; G02B 5/22; G02B 5/286; G02B 5/285; G02B 7/008; F28F 13/18; F28F 13/185; B82Y 20/00
(Continued)

(56) References Cited

U.S. PATENT DOCUMENTS 3,858,046 A * 12/1974 Cubalchini ............. G01S 3/781
250/203.1
6,172,296 B1 * 1/2001 Iwasaki ................. H01L 31/056
136/258

(Continued)

FOREIGN PATENT DOCUMENTS

CN    101393289    3/2009
CN    203164459    8/2013
(Continued)

OTHER PUBLICATIONS

"International Search Report (Form PCT/ISA/210)" of PCT/CN2019/072320, dated Apr. 30, 2019, with English translation thereof, pp. 1-4.
(Continued)

*Primary Examiner* — Stephone B Allen
*Assistant Examiner* — Jyotsna V Dabbi
(74) *Attorney, Agent, or Firm* — JCIP GLOBAL INC.

(57) ABSTRACT

This disclosure discloses a radiative cooling optical filter, comprising a substrate. One side of the substrate is polished, and the rough side of the substrate is provided with a metal reflective layer. The polished side of the substrate is subsequently provided with the intermediate layers and a top layer. The intermediate layer comprises alternatingly arranged layers A and layers B. The thickness of each layer A and layer B is 50-400 nm. The material of the layer A is silicon dioxide or aluminum oxide, and the material of the layer B is titanium dioxide, silicon nitride or silicon carbide. The material of the top layer is ytterbium fluoride, yttrium fluoride or zinc sulfide. The intermediate layer and the top layer jointly constitute a multi-resonant absorption enhancer in the atmospheric transparent window.

18 Claims, 3 Drawing Sheets

(58) Field of Classification Search
USPC .......................................................... 359/359
See application file for complete search history.

(56) References Cited

U.S. PATENT DOCUMENTS 7,349,151 B2 * 3/2008 Wu ........................ G02B 5/285
359/359
2017/0314878 A1 11/2017 Raman et al.

FOREIGN PATENT DOCUMENTS

| CN | 105723255 | 6/2016 |
| CN | 108710169 | 10/2018 |
| JP | H07174917 | 7/1995 |
| JP | H09159339 | 6/1997 |

OTHER PUBLICATIONS

"Written Opinion of the International Searching Authority (Form PCT/ISA/237)" of PCT/CN2019/072320, dated Apr. 30, 2019, pp. 1-4.
Linxiao Zhu, et al., "Radiative cooling of solar absorbers using a visibly transparent photonic crystal thermal blackbody." PNAS, vol. 11, No. 40, Oct. 6, 2015, pp. 12282-12287.
Md Muntasir, et al., "A Metamaterial Emitter for Highly Efficient Radiative Cooling." Advanced Optical Materials, vol. 3, No. 8, Apr. 2, 2015, pp. 31047-31051.

* cited by examiner

RADIATIVE COOLING OPTICAL FILTER, ITS PREPARING METHOD AND APPLICATION

CROSS-REFERENCE TO RELATED APPLICATION

This application is a 371 of international application of PCT application serial no. PCT/CN2019/072320, filed on Jan. 18, 2019, which claims the priority benefit of China application no. 201810882085.9, filed on Aug. 3, 2018. The entirety of each of the above mentioned patent applications is hereby incorporated by reference herein and made a part of this specification.

TECHNICAL FIELD

This disclosure relates to the environmental protection, the energy saving field and the decoration field, specifically relates to a radiative cooling optical filter, its preparing method and application.

BACKGROUND ART

Color filter is a common optical device that selectively reflects or transmits specific wavelength in visible optical waveband to present different colors, wherein the RGB color filter is widely applied in the fields of LCD, optical communication, sensing detection, imaging and so forth.

Optical filters can be divided into reflective filters and transmission filters, wherein reflective filter means that the filter can reflect light of specific wavelength to display specific color. When the incident light source is white light (e.g., the sunlight), the reflective filter displays specific color by reflecting light of specific wavelength, and the light of other wavebands can be selectively transmitted to the space of the back surface of the filter. The more common method is to use material with absorptive characteristics (e.g., black silicon) at the back of the filter to absorb those light so as to prevent ambient light entering from the back surface, which would otherwise reduce the color purity of the filter. Therefore, the light energy absorbed by the filter prepared as described above will transfer into heat that cannot be utilized. If subject to long time hard light irradiation, the heat absorbed can even "burn out" the filter. Therefore, in hot summer, the optical filter used as exterior decoration of a building generally needs to be cooled to extend its service life. However, this will increase the cooling energy consumption of the building.

Atmospheric transparent window refers to the band of the light with low reflection, low absorption, low scattering and high transmittance when the electromagnetic wave passes through the atmosphere. The atmospheric window corresponding to the radiation of the earth surface object is 8-13 μm band. Based on this, a radiative cooling method has been proposed, of which the core idea is that the object transmits the heat into the outer space of ultra-low temperature through the atmospheric transparent window. On the basis of a radiator, cooling during day can be realized with the reflective module of the solar radiation combined.

Based on the idea of radiative cooling, researchers have proposed multiple methods. Hossain et al. utilize a conic meta-material (CMM) column array structure to realize a peak radiation coefficient at approximately 90% at IR atmospheric transparent window (8-13 μm) (A Meta-material Emitter for Highly Efficient Radiative Cooling, Advanced Optical Materials, 31047-1051 (2015)). Zhu et al. adopt a 3D photonic crystal structure etching periodic micro-pore array on a silicon dioxide panel to achieve an average radiation coefficient up to 96.2% at the exiting angle of 10° for IR atmospheric transparent window (8-13 μm) (Radiative Cooling of Solar Absorbers Using A Visibly Transparent Photonic Crystal Thermal Blackbody, PNAS, Vol 112(5), 12285 (2015)).

However, in the proposed methods mentioned above, the structure of the devices is complex with high processing difficulty and high preparing cost, which generally requires complex nanofabrication technology such as electron beam lithography and are not easy to implement in large scale and large area production.

CONTENT OF THE INVENTION

This disclosure provides a reflective filter with radiative cooling function, based on the principle of one-dimensional photonic crystal and scattering. By reflecting, scattering and absorbing the electromagnetic waves of different bands, the filter can present different colors such as red, green and blue and realize daytime radiation cooling with the simple structure and low preparing cost, which is suitable for mass production.

This disclosure provides a technical solution as follows:

A radiative cooling optical filter, comprises a substrate with one side is polished and the rough side of the substrate is provided with a metal reflective layer when the polished side of the substrate is subsequently provided with an intermediate layer and a top layer.

The intermediate layer comprises alternatingly arranged layers A and layers B, the thickness of each layer A and layer B is 50-400 nm.

A material of the layer A is silicon dioxide or aluminum oxide, and a material of the layer B is titanium dioxide, silicon nitride or silicon carbide.

Or, the material of the layer A is titanium dioxide or aluminum oxide, and the material of the layer B is silicon dioxide, silicon nitride or silicon carbide.

The material of the top layer is ytterbium fluoride, yttrium fluoride or zinc sulfide.

The intermediate layer and the top layer jointly constitute a multi-resonant absorption enhancer within the atmospheric transparent window (8-13 μm).

Based on the dispersion characteristics of the materials, in the visible light band, silicon dioxide or aluminum oxide is the low refractive index material, while titanium dioxide, silicon nitride or silicon carbide is the high refractive index material. In the atmospheric transparent window, titanium dioxide or aluminum oxide is low refractive index material, while silicon dioxide, silicon nitride or silicon carbide is high refractive index material. In visible light band or atmospheric transparent window, the layers A and B constitute the intermediate layer with alternatingly laminated high-low refractive index materials.

Due to the ultra-low absorption of the materials of the layers A and B in this disclosure in the visible-near IR waveband (0.3-2.5 μm), the whole structure has very low absorbance in the visible-near IR waveband, i.e., its absorption of solar radiation is very small. Besides, the rough side structure of the substrate in conjunction with the metal reflective layer can effectively scatter and reflect 96% of incident solar radiation or above. The intermediate layer and the top layer jointly constitute a multi-resonant absorption enhancer to provide very strong radiating capacity in the atmospheric transparent window that is able to "project" the heat of the object into the outer space in the form of IR radiation, realizing the purpose of cooling. Meanwhile, in the visible light band (0.3-0.78 μm), the radiative cooling filter reflects the light of the specific waveband, realizing optical filtering.

The material of the substrate can be a hard material such as K9, fused quartz, sapphire, silicon slice and white glass, or a flexible organic material such as polyethylene, polymethyl methacrylate, polydimethylsiloxane, polycarbonate and polyethylene glycol terephthalate.

The material of the metal reflective layer is gold, silver or aluminum, and the thickness of the metal reflective layer is larger than 100 nm.

Since the materials of the layer A, the layer B and the top layer all have no absorption in 0.3-2.5 μm waveband, the reflectivity of the whole filter in 0.3-2.5 μm waveband is mainly determined by the rough side structure and the metal reflective layer of the substrate. When the thickness of the metal reflective layer is over 100 nm, the sum of the scattering rate and reflectivity of the filter to the solar radiation waveband exceeds 96%.

Preferably, the material of the metal reflective layer is gold, silver or aluminum; further preferably, silver.

The intermediate layer comprises one or more units of the layers A/B.

Preferably, the number of the units of the layers A/B is 1-10.

Preferably, the thickness of each layer of the intermediate layer is 50-300 nm.

Preferably, the thickness of the top layer is 50-200 nm.

Through optimizing the thickness and number of the intermediate layers and the top layer, the optical filtering and cooling effect of the radiative cooling filter can be improved.

Preferably, the number of the units of the layers A/B is 4-6; in consideration of the high radiation requirement for the atmospheric transparent window, the material of the layer A is titanium dioxide, of which the thickness is 50-200 nm; the material of the layer B is silicon dioxide or titanium dioxide, of which the thickness is 50-250 nm; the material of the top layer is zinc sulfide, of which the thickness is 5-100 nm.

Preferably, in order to further improve the cooling efficiency of the radiative cooling filter, the intermediate layer has an aperiodic structure.

Aperiodic structure means that in the intermediate layer, the thicknesses of the units of the layers A/B are not completely the same.

Preferably, the material of the layer A is titanium dioxide, and the material of the layer B is silicon dioxide.

Both the silicon dioxide and titanium dioxide can constitute high-low refractive index alternating structures in the two different wavebands of the visible light and the atmospheric transparent window, achieving better cooling effect of the radiative cooling filter.

Preferably, the material of the layer A is titanium dioxide, and the material of the layer B is silicon dioxide. The layer A is arranged close to the substrate. The material of the top layer is zinc sulfide, of which the thickness is 95-100 nm.

The number of the units of the layers A/B is 6.

From the substrate to the top layer, the thicknesses of the layers of the intermediate layer are sequentially 89-91 nm, 110-115 nm, 85-90 nm, 78-82 nm, 90-95 nm, 80-85 nm, 83-87 nm, 120-125 nm, 175-180 nm, 115-120 nm, 85-90 nm and 85-90 nm.

The radiative cooling filter in the technical solution mentioned above is a radiative cooling red light filter.

Preferably, the material of the layer A is titanium dioxide, and the material of the layer B is silicon dioxide. The layer A is arranged close to the substrate. The material of the top layer is zinc sulfide, of which the thickness is 168-173 nm.

The number of the units of the layers A/B is 5.

From the substrate to the top layer, the thicknesses of the layers of the intermediate layer are sequentially 100-105 nm, 165-168 nm, 108-112 nm, 145-148 nm, 125-130 nm, 120-125 nm, 138-143 nm, 100-105 nm, 158-163 nm and 60-62 nm.

The radiative cooling filter in the technical solution mentioned above is a radiative cooling green light filter.

Preferably, the material of the layer A is titanium dioxide, and the material of the layer B is silicon dioxide. The layer A is arranged close to the substrate. The material of the top layer is zinc sulfide, of which the thickness is 125-130 nm.

The number of the units of the layers A/B is 4.

From the substrate to the top layer, the thicknesses of the layers of the intermediate layer are sequentially 125-130 nm, 255-260 nm, 133-135 nm, 68-72 nm, 130-135 nm, 238-242 nm, 120-125 nm, 270-275 nm.

The radiative cooling filter in the technical solution mentioned above is a radiative cooling blue light filter.

Preferably, the material of the layer A is titanium dioxide, and the material of the layer B is aluminum oxide. The layer A is arranged close to the substrate. The material of the top layer is zinc sulfide, of which the thickness is 95-100 nm.

The number of the units of the layers A/B is 6.

From the substrate to the top layer, the thicknesses of the layers of the intermediate layer are sequentially 90-92 nm, 85-90 nm, 85-90 nm, 75-80 nm, 75-80 nm, 100-105 nm, 60-657 nm, 118-122 nm, 50-55 nm, 108-112 nm, 75-80 nm and 70-75 nm.

The radiative cooling filter in the technical solution mentioned above is a radiative cooling red light filter.

Preferably, the material of the layer A is titanium dioxide, and the material of the layer B is aluminum oxide. The layer A is arranged close to the substrate. The material of the top layer is zinc sulfide, of which the thickness is 85-90 nm.

The number of the units of the layers A/B is 5.

From the substrate to the top layer, the thicknesses of the layers of the intermediate layer are sequentially 78-82 nm, 185-198 nm, 65-70 nm, 218-222 nm, 50-52 nm, 240-242 nm, 38-42 nm, 230-235 nm, 65-68 nm and 175-180 nm.

The radiative cooling filter in the technical solution mentioned above is a radiative cooling green light filter.

Preferably, the material of the layer A is titanium dioxide, and the material of the layer B is aluminum oxide. Layer A is arranged close to the substrate. The material of the top layer is zinc sulfide, of which the thickness is 5-10 nm.

The number of the units of the low/high refractive index layers is 6;

From the substrate to the top layer, the thicknesses of the layers of the intermediate layer are sequentially 20-22 nm, 55-60 nm, 55-60 nm, 50-55 nm, 43-48 nm, 58-62 nm, 55-60 nm, 53-57 nm, 35-40 nm, 65-68 nm, 58-63 nm and 85-90 nm.

The radiative cooling filter in the technical solution mentioned above is a radiative cooling blue light filter.

This disclosure provides a method for preparing radiative cooling filters, which has the benefits of simple preparation process, short cycle and low cost etc., and is suitable for mass production, comprising the following steps:

(1) Based on spectral characteristics of the three colors of red, green and blue, and considering the radiation coefficient requirement of the atmospheric transparent window, select the material of each layer, optimize its thickness, and design a film stack meeting the requirement.

Optimized operation of this step can be realized by using an existing software.

(2) Clean the surface of the substrate with diethyl ether solution.

(3) Deposit each layer on the top side of the substrate through electron beam evaporation coating.

(4) Coat the metal reflective layer on the bottom side of the substrate through thermal evaporation process to obtain the radiative cooling optical filter.

Preferably, in step (2), the substrate is put into the diethyl ether solution for 5-10 minutes of ultrasonic treatment.

Comparing with the prior art, the radiative cooling filter in this disclosure has very high average radiance, and the back side of the substrate is coated with a thick-enough metal reflective layer of ultra-high reflectivity. The optical filter can reflect the light of a specific waveband in the specular reflection direction to present a specific color; meanwhile, the rest of lights of the visible near IR waveband are evenly scattered back into the incident medium by the back side (rough side) of the substrate. With the metal reflective layer, the average absorbance of the filter in the visible near IR waveband is very low, and also has very low absorption of the solar radiation energy during the day.

The radiative cooling filter in this disclosure has angular insensitivity, and is able to maintain basically unchanged average radiation coefficient of the atmospheric window in a wide-angle range of ±60°. The radiative cooling filter provided in this disclosure based on one-dimensional photonic crystal comes with the simple structure, simple preparing process, low preparing cost and short preparing cycle, is suitable for mass production and application.

Therefore, the radiative cooling filter in this disclosure can be applied in the decoration field such as the exterior wall decoration of buildings. Comparing with the optical filter of the prior art, the filter provided in this disclosure not only can work under strong light for a long time, but also can realize passive radiative cooling, which can meet the original decoration application while reducing the temperature inside the building in hot summer, saving the energy consumption caused by conventional cooling methods and mitigating the greenhouse effect. Large-scale promotion will have a profound impact on global energy consumption and eco-environmental protection.

FIGURE DESCRIPTION

FIGS. 3A, 3B and 3C show spectrums in the visible light region of the radiative cooling optical filters, where

DETAILED DESCRIPTION

Below is further description of this disclosure in detail in conjunction with figures and embodiments, it shall be noted that the embodiments given below are to facilitate understanding of this disclosure rather than set any limit to the disclosure.

Figure 1:
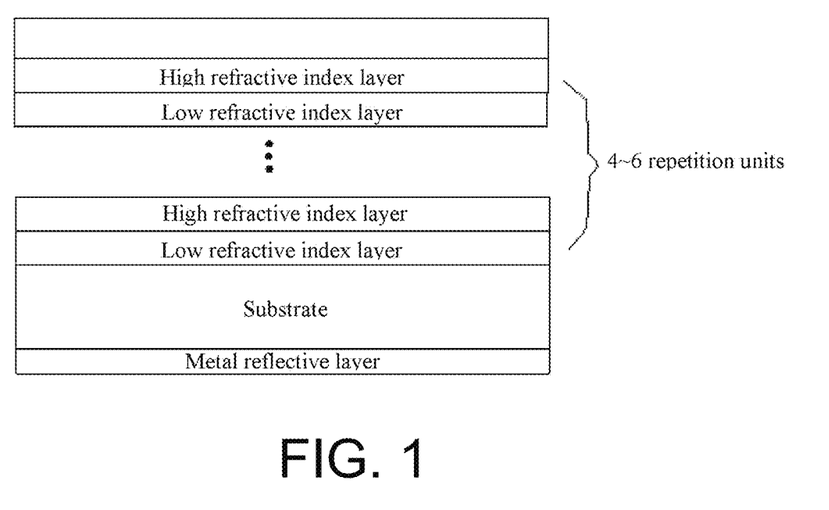
FIG. 1 is a schematic diagram of the radiative cooling optical filter.

As shown in FIG. 1, the radiative cooling filter in this disclosure comprises a one-side-polished substrate, a metal reflective layer at the bottom surface of the substrate, an intermediate layer at the top surface of the substrate and a top layer.

The material of the substrate can be a hard material such as K9 glass, fused quartz, sapphire, silicon slice and white glass, or can be a flexible organic material such as polyethylene, polymethyl methacrylate, polydimethylsiloxane, polycarbonate and polyethylene glycol terephthalate.

The substrate is one-side-polished, and the rough side of the substrate is coated with a metal reflective layer, of which the thickness is larger than 100 nm. All light scattered by the rough side of the substrate are reflected back into the incident medium (air). The material of the metal reflective layer can be gold, silver or aluminum etc., preferably in this disclosure, silver is selected.

The polished side of the substrate is coated with the intermediate layer, which comprises alternating arrangement of layers of high/low refractive index materials with the thickness of each layer in an aperiodic structure. In consideration of the visible light waveband, the high refractive index material can be titanium dioxide, silicon oxide or silicon nitride etc., of which the thickness is 50 nm-200 nm, whereas the low refractive index material can be silicon dioxide, aluminum oxide etc., of which the thickness is 50 nm-300 nm.

The material of the top layer can be zinc sulfide, ytterbium fluoride or yttrium fluoride etc., of which the thickness is 50 nm-200 nm. The top layer and the intermediate layer jointly constitute a multi-resonant absorption enhancer in the atmospheric transparent window (8-13 μm).

Figure 2:
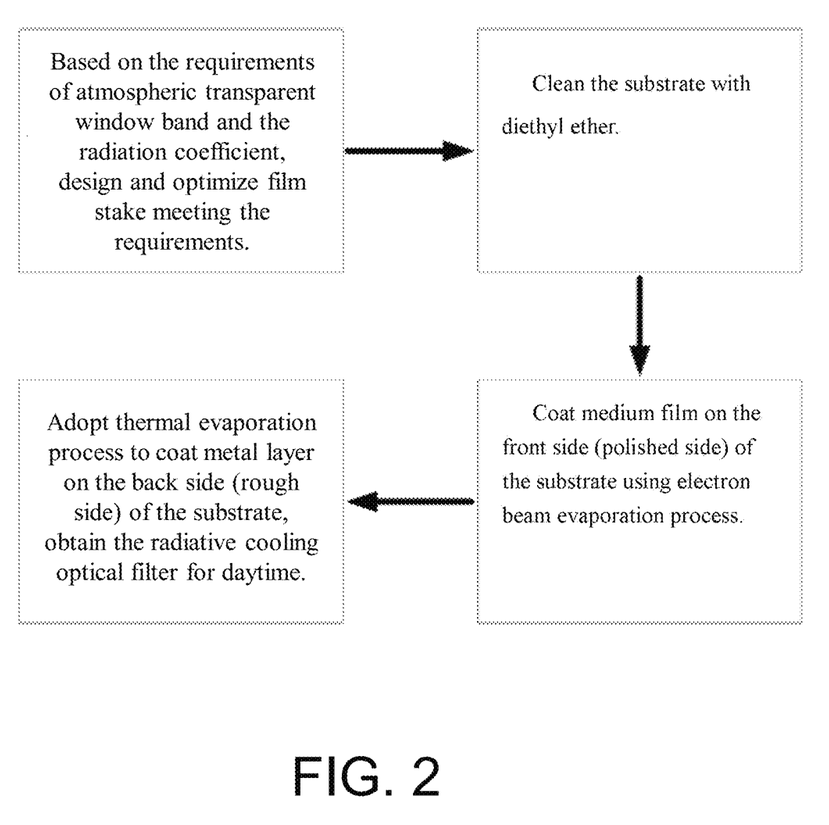
FIG. 2 is a preparation flow chart of the radiative cooling optical filter.

As shown in FIG. 2, the method for preparing the radiative cooling optical filter, comprises the following steps.

1) Based on the spectral characteristics of the three colors of red, green and blue, and considering the radiation coefficient requirement of the atmospheric transparent window, design a film stack meeting the requirement through optimizing the film stack design, including the selection of the film materials and the optimization of the thickness.

2) Put the substrate into the diethyl ether solution for 8 minutes of ultrasonic treatment, clean the substrate to ensure cleanness of the substrate surface.

3) Sequentially deposit the intermediate layer and the top layer on the polished side of the substrate by electron beam evaporation process, then coat the metal reflective layer on the rough side of the substrate to obtain the radiate cooling optical filter.

Embodiment 1

The corresponding material of the substrate is white glass. One side of the substrate is polished, and the rough side is coated with a metal reflective layer, of which the material is silver (>100 nm). The polished side of the substrate is deposited with the intermediate layers comprising alternating titanium dioxide layers and silicon dioxide layers. The top layer of zinc sulfide (98 nm) is deposited on the intermediate layer.

From the substrate to the top layer, the depositing parameters of the intermediate layer are as follow:

| Film layer | Material | Thickness/nm |
| --- | --- | --- |
| 1 | TiO$_2$ | 90 |
| 2 | SiO$_2$ | 113 |
| 3 | TiO$_2$ | 89 |
| 4 | SiO$_2$ | 80 |
| 5 | TiO$_2$ | 93 |
| 6 | SiO$_2$ | 83 |
| 7 | TiO$_2$ | 85 |
| 8 | SiO$_2$ | 124 |
| 9 | TiO$_2$ | 177 |
| 10 | SiO$_2$ | 119 |
| 11 | TiO$_2$ | 86 |
| 12 | SiO$_2$ | 87 |

Figure 3A:
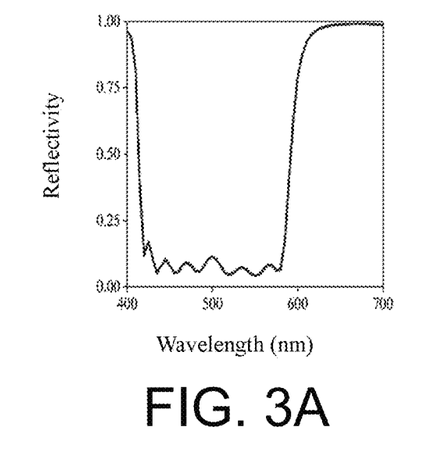
FIGS. 3A, 3B, and 3C are the visible light spectrums of the radiative cooling optical filters prepared in embodiments 1, 2 and 3, respectively.

The visible light spectrum of the obtained radiative cooling filter is as shown in FIG. 3A. The average reflectivity of 630-680 nm waveband is 98.8%, that of 420-580 nm waveband is 7.6%. The filter is a red filter.

Figure 4:
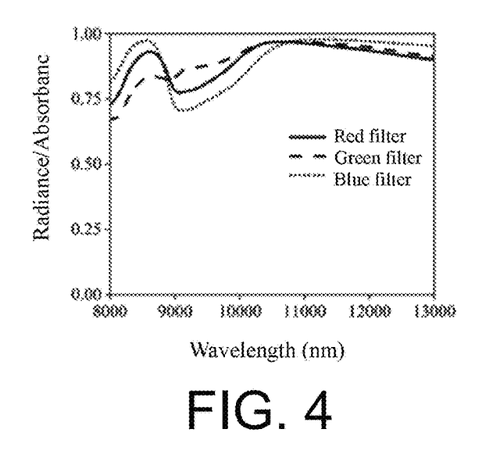
FIG. 4 is a spectrum of the average radiation coefficients of the radiative cooling filters prepared in embodiments 1, 2 and 3 at normal incidence in atmospheric transparent window.

The average radiation coefficient of the filter at normal incidence in the atmospheric transparent window is as shown in FIG. 4.

Figure 5:
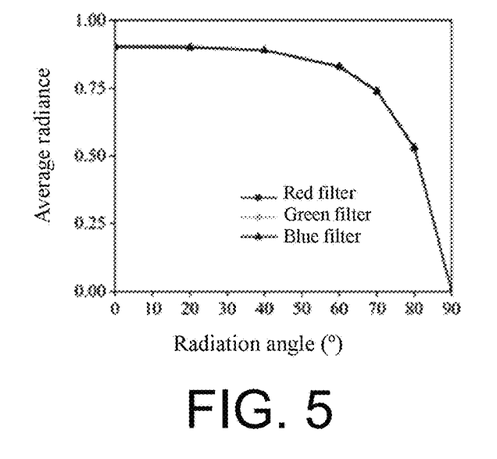
FIG. 5 is a graph showing the relationship between the average radiation coefficients and the radiation angles of the radiative cooling filters prepared in embodiments 1, 2 and 3 in atmospheric transparent window.

In the atmospheric transparent window (8-13 μm), the filter always has the characteristic of radiation angle insensitivity. As shown in FIG. 5, at normal incidence, the average radiation coefficient of the filter in the atmospheric transparent window reaches 90.2% or above. At the incidence angle of 20°, the average radiation coefficient in the atmospheric transparent window reaches 90.1% or above. At the incidence angle of 40°, the average radiation coefficient in atmospheric transparent window reaches 89.0% or above. At the incidence angle of 60°, the average radiation coefficient in atmospheric transparent window reaches 82.9% or above.

Embodiment 2

The corresponding material of the substrate is white glass. One side of the substrate is polished, and the rough side is coated with a metal reflective layer, of which the material is silver (>100 nm). The polished side of the substrate is deposited with the intermediate layers comprising alternating titanium dioxide layers and silicon dioxide layers. The top layer of zinc sulfide (170 nm) is deposited on the intermediate layer.

From the substrate to the top layer, the depositing parameters of the intermediate layer are as follow:

| Film layer | Material | Thickness/nm |
| --- | --- | --- |
| 1 | TiO$_2$ | 104 |
| 2 | SiO$_2$ | 168 |
| 3 | TiO$_2$ | 112 |
| 4 | SiO$_2$ | 148 |
| 5 | TiO$_2$ | 130 |
| 6 | SiO$_2$ | 124 |
| 7 | TiO$_2$ | 143 |
| 8 | SiO$_2$ | 104 |
| 9 | TiO$_2$ | 163 |
| 10 | SiO$_2$ | 62 |

Figure 3B:
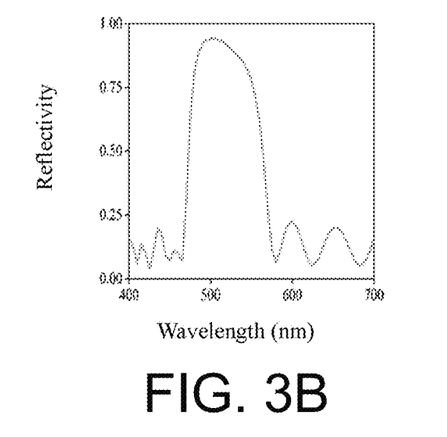

The visible light spectrum of the obtained radiative cooling filter is as shown in FIG. 3B. The average reflectivity of 480-540 nm waveband is 90.3%, that of 400-460 nm and 560-700 nm wavebands is 14.1%, the filter is a green filter.

The average radiation coefficient of the filter at normal incidence in the atmospheric transparent window is as shown in FIG. 4.

In the atmospheric transparent window (8-13 μm), the filter has the characteristic of radiation angle insensitivity. As shown in FIG. 5, at normal incidence, the average radiation coefficient of the filter in the atmospheric transparent window reaches 90.2% or above. At the incidence angle of 20°, the average radiation coefficient in the atmospheric transparent window reaches 90.1% or above. At the incidence angle of 40°, the average radiation coefficient in the atmospheric transparent window reaches 89.0% or above. At the incidence angle of 60°, the average radiation coefficient in the atmospheric transparent window reaches 82.9% or above.

Embodiment 3

The corresponding material of the substrate is white glass. One side of the substrate is polished, and the rough side is coated with a metal reflective layer, of which the material is silver (>100 nm). The polished side of the substrate is deposited with the intermediate layers comprising alternating titanium dioxide layers and silicon dioxide layers. The top layer of zinc sulfide (127 nm) is deposited on the intermediate layer.

From the substrate to the top layer, the depositing parameters of the intermediate layer are as follow:

| Film layer | Material | Thickness/nm |
| --- | --- | --- |
| 1 | TiO$_2$ | 126 |
| 2 | SiO$_2$ | 257 |
| 3 | TiO$_2$ | 134 |
| 4 | SiO$_2$ | 70 |
| 5 | TiO$_2$ | 133 |
| 6 | SiO$_2$ | 240 |
| 7 | TiO$_2$ | 123 |
| 8 | SiO$_2$ | 273 |

Figure 3C:
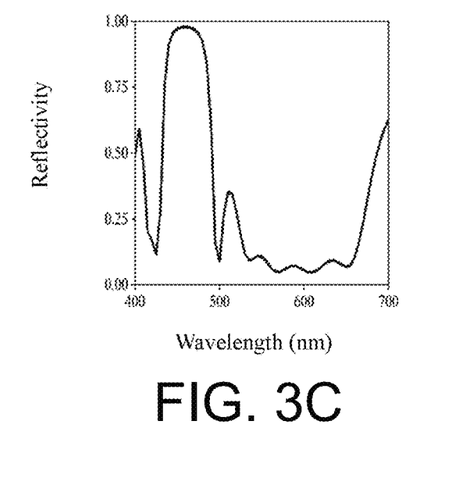

The visible light spectrum of the obtained radiative cooling filter is as shown in FIG. 3C. The average reflectivity of 440-480 nm waveband is 95.8%, that of 500-680 nm waveband is 12.7%. The filter is a blue filter.

The average radiation coefficient of the filter at normal incidence in the atmospheric transparent window is as shown in FIG. 4.

In the atmospheric transparent window (8-13 μm), the filter has the characteristic of radiation angle insensitivity. As shown in FIG. 5, at normal incidence, the average radiation coefficient of the filter in the atmospheric transparent window reaches 90.2% or above. At the incidence angle of 20°, the average radiation coefficient in atmospheric transparent window reaches 90.1% or above. At the incidence angle of 40°, the average radiation coefficient in atmospheric transparent window reaches 89.0% or above. At the incidence angle of 60°, the average radiation coefficient in atmospheric transparent window reaches 82.9% or above.

Embodiment 4

The corresponding material of the substrate is white glass. One side of the substrate is polished, and the rough side is coated with a metal reflective layer, of which the material is silver (>100 nm). The polished side of the substrate is deposited with the intermediate layers comprising alternating titanium dioxide layers and aluminum oxide layers. The top layer of zinc sulfide (97 nm) is deposited on the intermediate layer.

From the substrate to the top layer, the depositing parameters of the intermediate layer are as follow:

| Film layer | Material | Thickness/nm |
|---|---|---|
| 1 | $TiO_2$ | 91 |
| 2 | $Al_2O_3$ | 86 |
| 3 | $TiO_2$ | 86 |
| 4 | $Al_2O_3$ | 78 |
| 5 | $TiO_2$ | 77 |
| 6 | $Al_2O_3$ | 104 |
| 7 | $TiO_2$ | 62 |
| 8 | $Al_2O_3$ | 120 |
| 9 | $TiO_2$ | 52 |
| 10 | $Al_2O_3$ | 110 |
| 11 | $TiO_2$ | 78 |
| 12 | $Al_2O_3$ | 71 |

The radiative cooling filter obtained is a red filter.

Figure 6:
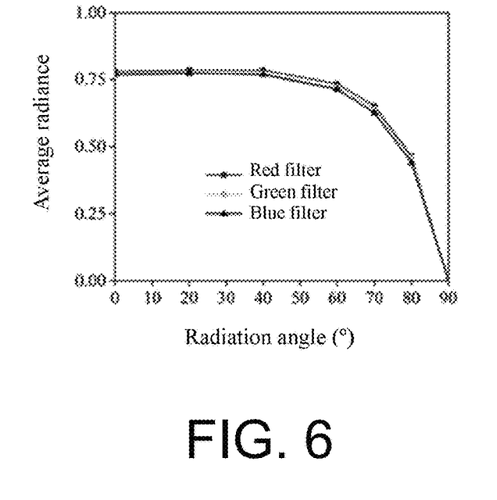
FIG. 6 is a graph showing the relationship between the average radiation coefficients and the radiation angles of the radiative cooling filters prepared in embodiments 4, 5 and 6 in atmospheric transparent window.

In the atmospheric transparent window (8-13 μm), the filter has the characteristic of radiation angle insensitivity. As shown in FIG. 6, at normal incidence, the average radiation coefficient in the atmospheric transparent window reaches 76.3% or above. At the incidence angle of 20°, the average radiation coefficient in the atmospheric transparent window reaches 77.0% or above. At the incidence angle of 40°, the average radiation coefficient in the atmospheric transparent window reaches 76.9% or above. At the incidence angle of 60°, the average radiation coefficient in the atmospheric transparent window reaches 71.3% or above.

Embodiment 5

The corresponding material of the substrate is white glass. One side of the substrate is polished, and the rough side is coated with a metal reflective layer, of which the material is silver (>100 nm). The polished side of the substrate is deposited with the intermediate layers comprising alternating titanium dioxide layers and aluminum oxide layers. The top layer of zinc sulfide (86 nm) is deposited on the intermediate layer.

From the substrate to the top layer, the depositing parameters of the intermediate layer are as follow:

| Film layer | Material | Thickness/nm |
|---|---|---|
| 1 | $TiO_2$ | 80 |
| 2 | $Al_2O_3$ | 188 |
| 3 | $TiO_2$ | 68 |
| 4 | $Al_2O_3$ | 220 |
| 5 | $TiO_2$ | 51 |
| 6 | $Al_2O_3$ | 241 |
| 7 | $TiO_2$ | 40 |
| 8 | $Al_2O_3$ | 232 |
| 9 | $TiO_2$ | 66 |
| 10 | $Al_2O_3$ | 177 |

The radiative cooling filter obtained is a green filter.

In the atmospheric transparent window (8-13 μm), the filter has the characteristic of radiation angle insensitivity. As shown in FIG. 6, at normal incidence, the average radiation coefficient in the atmospheric transparent window reaches 76.3% or above. At the incidence angle of 20°, the average radiation coefficient in the atmospheric transparent window reaches 77.0% or above. At the incidence angle of 40°, the average radiation coefficient in the atmospheric transparent window reaches 76.9% or above. At the incidence angle of 60°, the average radiation coefficient in the atmospheric transparent window reaches 71.3% or above.

Embodiment 6

The corresponding material of the substrate is white glass. One side of the substrate is polished, and the rough side is coated with a metal reflective layer, of which the material is silver (>100 nm). The polished side of the substrate is deposited with the intermediate layers comprising alternating titanium dioxide layers and aluminum oxide layers. The top layer of zinc sulfide (7 nm) is deposited on the intermediate layer.

From the substrate to the top layer, the depositing parameters of the intermediate layer are as follow:

| Film layer | Material | Thickness/nm |
|---|---|---|
| 1 | $TiO_2$ | 21 |
| 2 | $Al_2O_3$ | 59 |
| 3 | $TiO_2$ | 57 |
| 4 | $Al_2O_3$ | 52 |
| 5 | $TiO_2$ | 45 |
| 6 | $Al_2O_3$ | 60 |
| 7 | $TiO_2$ | 56 |
| 8 | $Al_2O_3$ | 55 |
| 9 | $TiO_2$ | 38 |
| 10 | $Al_2O_3$ | 66 |
| 11 | $TiO_2$ | 60 |
| 12 | $Al_2O_3$ | 87 |

The radiative cooling filter obtained is a blue filter.

In the atmospheric transparent window (8-13 μm), the filter has the characteristic of radiation angle insensitivity. As shown in FIG. 6, at normal incidence, the average radiation coefficient in the atmospheric transparent window reaches 76.3% or above. At the incidence angle of 20°, the average radiation coefficient in the atmospheric transparent window reaches 77.0% or above. At the incidence angle of 40°, the average radiation coefficient in the atmospheric transparent window reaches 76.9% or above. At the incidence angle of 60°, the average radiation coefficient in the atmospheric transparent window reaches 71.3% or above.

The embodiments described above give detailed descriptions of the technical solution and benefits of the disclosure, it shall be understood that the descriptions mentioned above are embodiments of the disclosure only, which shall not limit the disclosure. Any modification, supplement and equivalent replacement etc. in the scope of the principle of this disclosure shall be included in the protection scope of the disclosure.

What is claimed is:

1. A radiative cooling optical filter, comprising a substrate, wherein
one side of the substrate is polished, a rough side of the substrate is provided with a metal reflective layer, a polished side of the substrate is subsequently provided with an intermediate layer and a top layer,
the intermediate layer comprises alternatingly arranged layers A and layers B, thickness of each layer A and layer B is 50-400 nm respectively,
a material of the layer A is silicon dioxide or aluminum oxide, and a material of the layer B is titanium dioxide, silicon nitride or silicon carbide, or, the material of the layer A is titanium dioxide or aluminum oxide, and the material of the layer B is silicon dioxide, silicon nitride or silicon carbide, a material of the top layer is ytterbium fluoride, yttrium fluoride or zinc sulfide, the intermediate layer and the top layer jointly constitute a multi-resonant absorption enhancer in an atmospheric transparent window.

2. The radiative cooling optical filter according to claim 1, wherein a material of the substrate is a hard material selected from a group comprising K9, fused quartz, sapphire, silicon slice and white glass, or can be a flexible organic material selected from a group comprising polyethylene, polymethyl methacrylate, polydimethylsiloxane, polycarbonate and polyethylene glycol terephthalate.

3. The radiative cooling optical filter according to claim 1, wherein material of the metal reflective layer is gold, silver or aluminum.

4. The radiative cooling optical filter according to claim 1, wherein the intermediate layer comprises one or more units of the layers A/B, a number of the units of layers A/B is 1-10.

5. The radiative cooling optical filter according to claim 1, wherein in the intermediate layer, the thickness of each layer is 50-300 nm.

6. The radiative cooling optical filter according to claim 1, wherein a thickness of the top layer is 50-200 nm.

7. The radiative cooling optical filter according to claim 4, wherein the number of the units of the layers A/B is 4-6; in consideration of a high radiation requirement for the atmospheric transparent window, the material of the layer A is titanium dioxide, of which the thickness is 50-200 nm; the material of the layer B is silicon dioxide or titanium dioxide, of which the thickness is 50-250 nm; the material of the top layer is zinc sulfide, of which the thickness is 5-100 nm.

8. The radiative cooling optical filter according to claim 1, wherein the intermediate layer has an aperiodic structure.

9. A method for preparing the radiative cooling optical filter according to claim 1, comprising:
(1) based on spectral characteristics of three colors of red, green and blue, and considering a radiation coefficient requirement of the atmospheric transparent window, selecting the material of each layer, optimize its thickness, and designing a film stack meeting the requirement;
(2) cleaning a surface of the substrate with diethyl ether solution;
(3) depositing each layer on a top side of the substrate through electron beam evaporation coating;
(4) coating the metal reflective layer on a bottom side of the substrate through thermal evaporation process to obtain the radiative cooling optical filter.

10. A application of the radiative cooling optical filter according to claim 1 in in the decoration of exterior walls of buildings.

11. The radiative cooling optical filter according to claim 7, wherein the intermediate layer has an aperiodic structure.

12. A method for preparing the radiative cooling optical filter according to claim 2, comprising:
(1) based on spectral characteristics of three colors of red, green and blue, and considering a radiation coefficient requirement of the atmospheric transparent window, selecting the material of each layer, optimize its thickness, and designing a film stack meeting the requirement;
(2) cleaning a surface of the substrate with diethyl ether solution;
(3) depositing each layer on a top side of the substrate through electron beam evaporation coating;
(4) coating the metal reflective layer on a bottom side of the substrate through thermal evaporation process to obtain the radiative cooling optical filter.

13. A method for preparing the radiative cooling optical filter according to claim 3, comprising:
(1) based on spectral characteristics of three colors of red, green and blue, and considering a radiation coefficient requirement of the atmospheric transparent window, selecting the material of each layer, optimize its thickness, and designing a film stack meeting the requirement;
(2) cleaning a surface of the substrate with diethyl ether solution;
(3) depositing each layer on a top side of the substrate through electron beam evaporation coating;
(4) coating the metal reflective layer on a bottom side of the substrate through thermal evaporation process to obtain the radiative cooling optical filter.

14. A method for preparing the radiative cooling optical filter according to claim 4, comprising:
(1) based on spectral characteristics of three colors of red, green and blue, and considering a radiation coefficient requirement of the atmospheric transparent window, selecting the material of each layer, optimize its thickness, and designing a film stack meeting the requirement;
(2) cleaning a surface of the substrate with diethyl ether solution;
(3) depositing each layer on a top side of the substrate through electron beam evaporation coating;
(4) coating the metal reflective layer on a bottom side of the substrate through thermal evaporation process to obtain the radiative cooling optical filter.

15. A method for preparing the radiative cooling optical filter according to claim 5, comprising:
(1) based on spectral characteristics of three colors of red, green and blue, and considering a radiation coefficient requirement of the atmospheric transparent window, selecting the material of each layer, optimize its thickness, and designing a film stack meeting the requirement;
(2) cleaning a surface of the substrate with diethyl ether solution;
(3) depositing each layer on a top side of the substrate through electron beam evaporation coating;
(4) coating the metal reflective layer on a bottom side of the substrate through thermal evaporation process to obtain the radiative cooling optical filter.

16. A method for preparing the radiative cooling optical filter according to claim 6, comprising:
(1) based on spectral characteristics of three colors of red, green and blue, and considering a radiation coefficient requirement of the atmospheric transparent window, selecting the material of each layer, optimize its thickness, and designing a film stack meeting the requirement;
(2) cleaning a surface of the substrate with diethyl ether solution;
(3) depositing each layer on a top side of the substrate through electron beam evaporation coating;
(4) coating the metal reflective layer on a bottom side of the substrate through thermal evaporation process to obtain the radiative cooling optical filter.

17. A method for preparing the radiative cooling optical filter according to claim 7, comprising:
- (1) based on spectral characteristics of three colors of red, green and blue, and considering a radiation coefficient requirement of the atmospheric transparent window, selecting the material of each layer, optimize its thickness, and designing a film stack meeting the requirement;
- (2) cleaning a surface of the substrate with diethyl ether solution;
- (3) depositing each layer on a top side of the substrate through electron beam evaporation coating;
- (4) coating the metal reflective layer on a bottom side of the substrate through thermal evaporation process to obtain the radiative cooling optical filter.

18. A method for preparing the radiative cooling optical filter according to claim 8, comprising:
- (1) based on spectral characteristics of three colors of red, green and blue, and considering a radiation coefficient requirement of the atmospheric transparent window, selecting the material of each layer, optimize its thickness, and designing a film stack meeting the requirement;
- (2) cleaning a surface of the substrate with diethyl ether solution;
- (3) depositing each layer on a top side of the substrate through electron beam evaporation coating;
- (4) coating the metal reflective layer on a bottom side of the substrate through thermal evaporation process to obtain the radiative cooling optical filter.

* * * * *